United States Patent
Hjerrild et al.

(10) Patent No.: US 12,355,390 B1
(45) Date of Patent: Jul. 8, 2025

(54) SOLAR SHINGLE AND ASSOCIATED ROOFING SYSTEM AND METHOD

(71) Applicant: GAF Energy LLC, Parsippany, NJ (US)

(72) Inventors: Natasha Hjerrild, Berkeley, CA (US); Nathan Peterson, Oakland, CA (US); David Kavulak, San Francisco, CA (US)

(73) Assignee: GAF Energy LLC, Parsippany, NJ (US)

( * ) Notice: Subject to any disclaimer, the term of this patent is extended or adjusted under 35 U.S.C. 154(b) by 0 days.

(21) Appl. No.: 18/423,768

(22) Filed: Jan. 26, 2024

Related U.S. Application Data

(60) Provisional application No. 63/483,111, filed on Feb. 3, 2023.

(51) Int. Cl.
  *H02S 20/25* (2014.01)
  *H02S 40/34* (2014.01)

(52) U.S. Cl.
  CPC .............. *H02S 20/25* (2014.12); *H02S 40/34* (2014.12)

(58) Field of Classification Search
  None
  See application file for complete search history.

(56) References Cited

U.S. PATENT DOCUMENTS

| | | | |
|---|---|---|---|
| 1,981,467 | A | 11/1934 | Radtke |
| 3,156,497 | A | 11/1964 | Lessard |
| 3,581,779 | A | 6/1971 | Gilbert, Jr. |
| 4,258,948 | A | 3/1981 | Hoffmann |
| 4,349,220 | A | 9/1982 | Carroll et al. |
| 4,499,702 | A | 2/1985 | Turner |
| 4,636,577 | A | 1/1987 | Peterpaul |
| 5,167,579 | A | 12/1992 | Rotter |

(Continued)

FOREIGN PATENT DOCUMENTS

| | | |
|---|---|---|
| CA | 2829440 A | 5/2019 |
| CH | 700095 A2 | 6/2010 |

(Continued)

OTHER PUBLICATIONS

Sunflare, Procducts: "Sunflare Develops Prototype for New Residential Solar Shingles"; 2019 «sunflaresolar.com/news/sunflare-develops-prototype-for-new-residential-solar-shingles» retrieved Feb. 2, 2021.

(Continued)

*Primary Examiner* — Eli S Mekhlin
(74) *Attorney, Agent, or Firm* — GREENBERG TRAURIG, LLP

(57) ABSTRACT

A roofing system, includes: a roof deck; a first roofing shingle installed on the roof deck, where the first roofing shingle comprises a reveal portion and a head lap portion; a first step flap installed on the roof deck; and a first solar shingle installed on the roof deck, where the first solar shingle includes: a reveal portion, where the reveal portion includes a plurality of solar cells, a first side lap; a first side flap, and a second side flap, where the reveal portion of the first roofing shingle covers the first side flap of the first solar shingle, where a first portion of the first step flap covers the second side flap of the first solar shingle, where a second portion of the first step flap is under the first side lap of the first solar shingle.

20 Claims, 5 Drawing Sheets

(56) References Cited

U.S. PATENT DOCUMENTS

| | | |
|---|---|---|
| 5,437,735 A | 8/1995 | Younan et al. |
| 5,590,495 A | 1/1997 | Bressler et al. |
| 5,642,596 A | 7/1997 | Waddington |
| 6,008,450 A | 12/1999 | Ohtsuka et al. |
| 6,033,270 A | 3/2000 | Stuart |
| 6,046,399 A | 4/2000 | Kapner |
| 6,201,180 B1 | 3/2001 | Meyer et al. |
| 6,220,329 B1 | 4/2001 | King et al. |
| 6,308,482 B1 | 10/2001 | Strait |
| 6,320,114 B1 | 11/2001 | Kuechler |
| 6,320,115 B1 | 11/2001 | Kataoka et al. |
| 6,336,304 B1 | 1/2002 | Mimura et al. |
| 6,341,454 B1 | 1/2002 | Koleoglou |
| 6,407,329 B1 | 6/2002 | Iino et al. |
| 6,576,830 B2 | 6/2003 | Nagao et al. |
| 6,928,781 B2 | 8/2005 | Desbois et al. |
| 6,972,367 B2 | 12/2005 | Federspiel et al. |
| 7,138,578 B2 | 11/2006 | Komamine |
| 7,155,870 B2 | 1/2007 | Almy |
| 7,178,295 B2 | 2/2007 | Dinwoodie |
| 7,487,771 B1 | 2/2009 | Eiffert et al. |
| 7,587,864 B2 | 9/2009 | McCaskill et al. |
| 7,678,990 B2 | 3/2010 | McCaskill et al. |
| 7,678,991 B2 | 3/2010 | McCaskill et al. |
| 7,748,191 B2 | 7/2010 | Podirsky |
| 7,819,114 B2 | 10/2010 | Augenbraun et al. |
| 7,824,191 B1 | 11/2010 | Podirsky |
| 7,832,176 B2 | 11/2010 | McCaskill et al. |
| 8,118,109 B1 | 2/2012 | Hacker |
| 8,168,880 B2 | 5/2012 | Jacobs et al. |
| 8,173,889 B2 | 5/2012 | Kalkanoglu et al. |
| 8,210,570 B1 | 7/2012 | Railkar et al. |
| 8,276,329 B2 | 10/2012 | Lenox |
| 8,312,693 B2 | 11/2012 | Cappelli |
| 8,319,093 B2 | 11/2012 | Kalkanoglu et al. |
| 8,333,040 B2 | 12/2012 | Shiao et al. |
| 8,371,076 B2 | 2/2013 | Jones et al. |
| 8,375,653 B2 | 2/2013 | Shiao et al. |
| 8,404,967 B2 | 3/2013 | Kalkanoglu et al. |
| 8,410,349 B2 | 4/2013 | Kalkanoglu et al. |
| 8,418,415 B2 | 4/2013 | Shiao et al. |
| 8,438,796 B2 | 5/2013 | Shiao et al. |
| 8,468,754 B2 | 6/2013 | Railkar et al. |
| 8,468,757 B2 | 6/2013 | Krause et al. |
| 8,505,249 B2 | 8/2013 | Geary |
| 8,512,866 B2 | 8/2013 | Taylor |
| 8,513,517 B2 | 8/2013 | Kalkanoglu et al. |
| 8,586,856 B2 | 11/2013 | Kalkanoglu et al. |
| 8,601,754 B2 | 12/2013 | Jenkins et al. |
| 8,629,578 B2 | 1/2014 | Kurs et al. |
| 8,646,228 B2 | 2/2014 | Jenkins |
| 8,656,657 B2 | 2/2014 | Livsey et al. |
| 8,671,630 B2 | 3/2014 | Lena et al. |
| 8,677,702 B2 | 3/2014 | Jenkins |
| 8,695,289 B2 | 4/2014 | Koch et al. |
| 8,713,858 B1 | 5/2014 | Xie |
| 8,713,860 B2 | 5/2014 | Railkar et al. |
| 8,733,038 B2 | 5/2014 | Kalkanoglu et al. |
| 8,776,455 B2 | 7/2014 | Azoulay |
| 8,789,321 B2 | 7/2014 | Ishida |
| 8,793,940 B2 | 8/2014 | Kalkanoglu et al. |
| 8,793,941 B2 | 8/2014 | Bosler et al. |
| 8,826,607 B2 | 9/2014 | Shiao et al. |
| 8,835,751 B2 | 9/2014 | Kalkanoglu et al. |
| 8,863,451 B2 | 10/2014 | Jenkins et al. |
| 8,898,970 B2 | 12/2014 | Jenkins et al. |
| 8,925,262 B2 | 1/2015 | Railkar et al. |
| 8,943,766 B2 | 2/2015 | Gombarick et al. |
| 8,946,544 B2 | 2/2015 | Jabos et al. |
| 8,950,128 B2 | 2/2015 | Kalkanoglu et al. |
| 8,959,848 B2 | 2/2015 | Jenkins et al. |
| 8,966,838 B2 | 3/2015 | Jenkins |
| 8,966,850 B2 | 3/2015 | Jenkins et al. |
| 8,994,224 B2 | 3/2015 | Mehta et al. |
| 9,032,672 B2 | 5/2015 | Livsey et al. |
| 9,153,950 B2 | 10/2015 | Yamanaka et al. |
| 9,166,087 B2 | 10/2015 | Chihlas et al. |
| 9,169,646 B2 | 10/2015 | Rodrigues et al. |
| 9,170,034 B2 | 10/2015 | Bosler et al. |
| 9,178,465 B2 | 11/2015 | Shiao et al. |
| 9,202,955 B2 | 12/2015 | Livsey et al. |
| 9,212,832 B2 | 12/2015 | Jenkins |
| 9,217,584 B2 | 12/2015 | Kalkanoglu et al. |
| 9,270,221 B2 | 2/2016 | Zhao |
| 9,273,885 B2 | 3/2016 | Rordigues et al. |
| 9,276,141 B2 | 3/2016 | Kalkanoglu et al. |
| 9,331,224 B2 | 5/2016 | Koch et al. |
| 9,356,174 B2 | 5/2016 | Duarte et al. |
| 9,359,014 B1 | 6/2016 | Yang et al. |
| 9,412,890 B1 | 8/2016 | Meyers |
| 9,528,270 B2 | 12/2016 | Jenkins et al. |
| 9,605,432 B1 | 3/2017 | Robbins |
| 9,711,672 B2 | 7/2017 | Wang |
| 9,755,573 B2 | 9/2017 | Livsey et al. |
| 9,786,802 B2 | 10/2017 | Shiao et al. |
| 9,831,818 B2 | 11/2017 | West |
| 9,912,284 B2 | 3/2018 | Svec |
| 9,923,515 B2 | 3/2018 | Rodrigues et al. |
| 9,938,729 B2 | 4/2018 | Coon |
| 9,991,412 B2 | 6/2018 | Gonzalez et al. |
| 9,998,067 B2 | 6/2018 | Kalkanoglu et al. |
| 10,027,273 B2 | 7/2018 | West et al. |
| 10,115,850 B2 | 10/2018 | Rodrigues et al. |
| 10,128,660 B1 | 11/2018 | Apte et al. |
| 10,156,075 B1 | 12/2018 | McDonough |
| 10,187,005 B2 | 1/2019 | Rodrigues et al. |
| 10,256,765 B2 | 4/2019 | Rodrigues et al. |
| 10,284,136 B1 | 5/2019 | Mayfield et al. |
| 10,454,408 B2 | 10/2019 | Livsey et al. |
| 10,530,292 B1 | 1/2020 | Cropper et al. |
| 10,560,048 B2 | 2/2020 | Fisher et al. |
| 10,563,406 B2 | 2/2020 | Kalkanoglu et al. |
| D879,031 S | 3/2020 | Lance et al. |
| 10,579,028 B1 | 3/2020 | Jacob |
| 10,784,813 B2 | 9/2020 | Kalkanoglu et al. |
| D904,289 S | 12/2020 | Lance et al. |
| 11,012,026 B2 | 5/2021 | Kalkanoglu et al. |
| 11,177,639 B1 | 11/2021 | Nguyen et al. |
| 11,217,715 B2 | 1/2022 | Sharenko |
| 11,251,744 B1 | 2/2022 | Bunea et al. |
| 11,258,399 B2 | 2/2022 | Kalkanoglu et al. |
| 11,283,394 B2 | 3/2022 | Perkins et al. |
| 11,309,828 B2 | 4/2022 | Sirski et al. |
| 11,394,344 B2 | 7/2022 | Perkins et al. |
| 11,424,379 B2 | 8/2022 | Sharenko et al. |
| 11,431,280 B2 | 8/2022 | Liu et al. |
| 11,431,281 B2 | 8/2022 | Perkins et al. |
| 11,444,569 B2 | 9/2022 | Clemente et al. |
| 11,454,027 B2 | 9/2022 | Kuiper et al. |
| 11,459,757 B2 | 10/2022 | Nguyen et al. |
| 11,486,144 B2 | 11/2022 | Bunea et al. |
| 11,489,482 B2 | 11/2022 | Peterson et al. |
| 11,496,088 B2 | 11/2022 | Sirski et al. |
| 11,508,861 B1 | 11/2022 | Perkins et al. |
| 11,512,480 B1 | 11/2022 | Achor et al. |
| 11,527,665 B2 | 12/2022 | Boitnott |
| 11,545,927 B2 | 1/2023 | Abra et al. |
| 11,545,928 B2 | 1/2023 | Perkins et al. |
| 11,658,470 B2 | 5/2023 | Nguyen et al. |
| 11,661,745 B2 | 5/2023 | Bunea et al. |
| 11,689,149 B2 | 6/2023 | Clemente et al. |
| 11,705,531 B2 | 7/2023 | Sharenko et al. |
| 11,728,759 B2 | 8/2023 | Nguyen et al. |
| 11,732,490 B2 | 8/2023 | Achor et al. |
| 11,811,361 B1 | 11/2023 | Farhangi et al. |
| 11,824,486 B2 | 11/2023 | Nguyen et al. |
| 11,824,487 B2 | 11/2023 | Nguyen et al. |
| 11,843,067 B2 | 12/2023 | Nguyen et al. |
| 2002/0053360 A1 | 5/2002 | Kinoshita et al. |
| 2002/0129849 A1 | 9/2002 | Heckeroth |
| 2003/0101662 A1 | 6/2003 | Ullman |
| 2003/0132265 A1 | 7/2003 | Villela et al. |
| 2003/0217768 A1 | 11/2003 | Guha |
| 2004/0000334 A1 | 1/2004 | Ressler |

(56) References Cited

U.S. PATENT DOCUMENTS

| | | |
|---|---|---|
| 2005/0030187 A1 | 2/2005 | Peress et al. |
| 2005/0115603 A1 | 6/2005 | Yoshida et al. |
| 2005/0144870 A1 | 7/2005 | Dinwoodie |
| 2005/0178428 A1 | 8/2005 | Laaly et al. |
| 2005/0193673 A1 | 9/2005 | Rodrigues et al. |
| 2006/0042683 A1 | 3/2006 | Gangemi |
| 2006/0046084 A1 | 3/2006 | Yang et al. |
| 2007/0074757 A1 | 4/2007 | Mellott et al. |
| 2007/0181174 A1 | 8/2007 | Ressler |
| 2007/0193618 A1 | 8/2007 | Bressler et al. |
| 2007/0249194 A1 | 10/2007 | Liao |
| 2007/0295385 A1 | 12/2007 | Sheats et al. |
| 2008/0006323 A1 | 1/2008 | Kalkanoglu et al. |
| 2008/0035140 A1 | 2/2008 | Placer et al. |
| 2008/0315061 A1 | 2/2008 | Placer et al. |
| 2008/0078440 A1 | 4/2008 | Lim et al. |
| 2008/0185748 A1 | 8/2008 | Kalkanoglu |
| 2008/0271774 A1 | 11/2008 | Kalkanoglu et al. |
| 2008/0302030 A1 | 12/2008 | Stancel et al. |
| 2009/0000222 A1 | 1/2009 | Kalkanoglu et al. |
| 2009/0014057 A1 | 1/2009 | Croft et al. |
| 2009/0014058 A1 | 1/2009 | Croft et al. |
| 2009/0019795 A1 | 1/2009 | Szacsvay et al. |
| 2009/0044850 A1 | 2/2009 | Kimberley |
| 2009/0114261 A1 | 5/2009 | Stancel et al. |
| 2009/0133340 A1 | 5/2009 | Shiao et al. |
| 2009/0159118 A1 | 6/2009 | Kalkanoglu et al. |
| 2009/0178350 A1 | 7/2009 | Kalkanoglu et al. |
| 2009/0229652 A1 | 9/2009 | Mapel et al. |
| 2009/0275247 A1 | 11/2009 | Richter et al. |
| 2010/0019580 A1 | 1/2010 | Croft et al. |
| 2010/0095618 A1 | 4/2010 | Edison et al. |
| 2010/0101634 A1 | 4/2010 | Frank et al. |
| 2010/0116325 A1 | 5/2010 | Nikoonahad |
| 2010/0131108 A1 | 5/2010 | Meyer |
| 2010/0139184 A1 | 6/2010 | Williams et al. |
| 2010/0146878 A1 | 6/2010 | Koch et al. |
| 2010/0159221 A1 | 6/2010 | Kourtakis et al. |
| 2010/0170169 A1 | 7/2010 | Railkar et al. |
| 2010/0186798 A1 | 7/2010 | Tormen et al. |
| 2010/0242381 A1 | 9/2010 | Jenkins |
| 2010/0313499 A1 | 12/2010 | Gangemi |
| 2010/0325976 A1 | 12/2010 | DeGenfelder et al. |
| 2010/0326488 A1 | 12/2010 | Aue et al. |
| 2010/0326501 A1 | 12/2010 | Zhao et al. |
| 2011/0030761 A1 | 2/2011 | Kalkanoglu et al. |
| 2011/0036386 A1 | 2/2011 | Browder |
| 2011/0036389 A1 | 2/2011 | Hardikar et al. |
| 2011/0048507 A1 | 3/2011 | Livsey et al. |
| 2011/0058337 A1 | 3/2011 | Han et al. |
| 2011/0061326 A1 | 3/2011 | Jenkins |
| 2011/0100436 A1 | 5/2011 | Cleereman et al. |
| 2011/0104488 A1 | 5/2011 | Muessig et al. |
| 2011/0132427 A1 | 6/2011 | Kalkanoglu et al. |
| 2011/0168238 A1 | 7/2011 | Metin et al. |
| 2011/0239555 A1 | 10/2011 | Cook et al. |
| 2011/0302859 A1 | 12/2011 | Crasnianski |
| 2011/0314753 A1 | 12/2011 | Farmer et al. |
| 2012/0034799 A1 | 2/2012 | Hunt |
| 2012/0060434 A1 | 3/2012 | Jacobs |
| 2012/0060902 A1 | 3/2012 | Drake |
| 2012/0085392 A1 | 4/2012 | Albert et al. |
| 2012/0137600 A1 | 6/2012 | Jenkins |
| 2012/0176077 A1 | 7/2012 | Oh et al. |
| 2012/0212065 A1 | 8/2012 | Cheng et al. |
| 2012/0233940 A1 | 9/2012 | Perkins et al. |
| 2012/0240490 A1 | 9/2012 | Gangemi |
| 2012/0260977 A1 | 10/2012 | Stancel |
| 2012/0266942 A1 | 10/2012 | Komatsu et al. |
| 2012/0279150 A1 | 11/2012 | Pislkak et al. |
| 2012/0282437 A1 | 11/2012 | Clark et al. |
| 2012/0291848 A1 | 11/2012 | Sherman et al. |
| 2013/0008499 A1 | 1/2013 | Verger et al. |
| 2013/0014455 A1 | 1/2013 | Grieco |
| 2013/0032198 A1* | 2/2013 | Laia .................. H02S 20/25 136/251 |
| 2013/0118558 A1 | 5/2013 | Sherman |
| 2013/0193769 A1 | 8/2013 | Mehta et al. |
| 2013/0247988 A1 | 9/2013 | Reese et al. |
| 2013/0284267 A1 | 10/2013 | Plug et al. |
| 2013/0306137 A1 | 11/2013 | Ko |
| 2014/0090697 A1 | 4/2014 | Rodrigues et al. |
| 2014/0150843 A1 | 6/2014 | Pearce et al. |
| 2014/0173997 A1 | 6/2014 | Jenkins |
| 2014/0179220 A1 | 6/2014 | Railkar et al. |
| 2014/0182222 A1 | 7/2014 | Kalkanoglu et al. |
| 2014/0208675 A1 | 7/2014 | Beerer et al. |
| 2014/0254776 A1 | 9/2014 | O'Connor et al. |
| 2014/0266289 A1 | 9/2014 | Della Sera et al. |
| 2014/0311556 A1 | 10/2014 | Feng et al. |
| 2014/0352760 A1 | 12/2014 | Haynes et al. |
| 2014/0366464 A1 | 12/2014 | Rodrigues et al. |
| 2015/0089895 A1 | 4/2015 | Leitch |
| 2015/0162459 A1 | 6/2015 | Lu et al. |
| 2015/0340516 A1 | 11/2015 | Kim et al. |
| 2015/0349173 A1 | 12/2015 | Morad et al. |
| 2016/0105144 A1 | 4/2016 | Haynes et al. |
| 2016/0142008 A1 | 5/2016 | Lopez et al. |
| 2016/0254776 A1 | 9/2016 | Rodrigues et al. |
| 2016/0276508 A1 | 9/2016 | Huang et al. |
| 2016/0359451 A1 | 12/2016 | Mao et al. |
| 2017/0159292 A1 | 6/2017 | Chihlas et al. |
| 2017/0179319 A1 | 6/2017 | Yamashita et al. |
| 2017/0179726 A1 | 6/2017 | Garrity et al. |
| 2017/0237390 A1 | 8/2017 | Hudson et al. |
| 2017/0331415 A1 | 11/2017 | Koppi et al. |
| 2018/0094438 A1 | 4/2018 | Wu et al. |
| 2018/0097472 A1 | 4/2018 | Anderson et al. |
| 2018/0115275 A1 | 4/2018 | Flanigan et al. |
| 2018/0254738 A1 | 9/2018 | Yang et al. |
| 2018/0294765 A1 | 10/2018 | Friedrich et al. |
| 2018/0351502 A1 | 12/2018 | Almy et al. |
| 2018/0367089 A1 | 12/2018 | Stutterheim et al. |
| 2019/0030867 A1 | 1/2019 | Sun et al. |
| 2019/0081436 A1 | 3/2019 | Onodi et al. |
| 2019/0123679 A1 | 4/2019 | Rodrigues et al. |
| 2019/0253022 A1 | 8/2019 | Hardar et al. |
| 2019/0305717 A1 | 10/2019 | Allen et al. |
| 2020/0109320 A1 | 4/2020 | Jiang |
| 2020/0144958 A1 | 5/2020 | Rodrigues et al. |
| 2020/0220819 A1 | 7/2020 | Vu et al. |
| 2020/0224419 A1 | 7/2020 | Boss et al. |
| 2020/0343397 A1 | 10/2020 | Hem-Jensen |
| 2021/0083619 A1 | 3/2021 | Hegedus |
| 2021/0115223 A1 | 4/2021 | Bonekamp et al. |
| 2021/0159353 A1 | 5/2021 | Li et al. |
| 2021/0301536 A1 | 9/2021 | Baggs et al. |
| 2021/0343886 A1 | 11/2021 | Sharenko et al. |
| 2022/0149213 A1 | 5/2022 | Mensink et al. |

FOREIGN PATENT DOCUMENTS

| | | |
|---|---|---|
| CN | 202797032 U | 3/2013 |
| CN | 217150978 U | 8/2022 |
| DE | 1958248 A1 | 11/1971 |
| EP | 1039361 A1 | 9/2000 |
| EP | 1837162 A1 | 9/2007 |
| EP | 1774372 A1 | 7/2011 |
| EP | 2446481 A2 | 5/2012 |
| EP | 2784241 A1 | 10/2014 |
| EP | 3772175 A1 | 2/2021 |
| JP | 10046767 A | 2/1998 |
| JP | 2002-106151 A | 4/2002 |
| JP | 2001-098703 A | 10/2002 |
| JP | 2017-027735 A | 2/2017 |
| JP | 2018053707 A | 4/2018 |
| KR | 20090084060 A | 8/2009 |
| KR | 10-1348283 B1 | 1/2014 |
| KR | 10-2019-0000367 A | 1/2019 |
| KR | 10-2253483 B1 | 5/2021 |
| NL | 2026856 B1 | 6/2022 |
| WO | 2010/151777 A2 | 12/2010 |
| WO | 2011/049944 A1 | 4/2011 |

(56) References Cited

FOREIGN PATENT DOCUMENTS

| WO | 2015/133632 A1 | 9/2015 |
| WO | 2018/000589 A1 | 1/2018 |
| WO | 2019/201416 A1 | 10/2019 |
| WO | 2020-159358 A1 | 8/2020 |
| WO | 2021-247098 A1 | 12/2021 |

OTHER PUBLICATIONS

RGS Energy, 3.5KW Powerhouse 3.0 system installed in an afternoon; Jun. 7, 2019 «facebook.com/RGSEnergy/» retrieved Feb. 2, 2021.
Tesla, Solar Roof «tesla.com/solarroof» retrieved Feb. 2, 2021.
"Types of Roofing Underlayment", Owens Corning Roofing; «https://www.owenscorning.com/en-us/roofing/tools/how-roofing-underlayment-helps-protect-your-home» retrieved Nov. 1, 2021.

* cited by examiner

SOLAR SHINGLE AND ASSOCIATED ROOFING SYSTEM AND METHOD

CROSS-REFERENCE TO RELATED APPLICATION

This application claims priority to U.S. provisional application 63/483,111, titled "SOLAR SHINGLE AND ASSOCIATED ROOFING SYSTEM AND METHOD," filed Feb. 3, 2023, the disclosure of which is incorporated by reference herein in its entirety.

FIELD

The present invention is directed to a shingle, and, more particularly, to a solar shingle as well as an associated roofing system and method.

BACKGROUND

In a known roofing system, one or more solar shingles are installed above a roof deck. Typically, the known roofing system also includes one or more roofing shingles (e.g., shingles that do not include any solar cells) on the roof deck adjacent the one or more solar shingles.

SUMMARY

The Claims, rather than the Summary, define covered embodiments of the present invention. The Summary is a high-level overview of various aspects of the invention, and introduces some concepts that are further described in the Detailed Description below. The Summary is not intended to identify key or essential features of the claimed subject matter, and also is not intended to be used in isolation to determine the scope of the claimed subject matter. Instead, the claimed subject matter should be understood by reference to appropriate portions of the Specification and drawings, as well as to each claim.

In some embodiments, the present invention provides a solar shingle, comprising: a first end, a second end opposite the first end, a first edge extending from the first end to the second end, and a second edge opposite the first edge and extending from the first end to the second end; a head lap portion extending from a first location between the first end and the second end to a second location between the first end and the second end and extending from the first edge to a third location between the first edge and the second edge; a reveal portion extending from the first location to the second location and from the second edge to the third location, wherein the reveal portion includes a plurality of solar cells, wherein the solar cells of the plurality of solar cells are arranged in at least a first row of solar cells and a second row of solar cells; and a first side lap at the first end, wherein an edge of the first side lap is offset from the second edge and between the first edge and the second edge.

In some embodiments, each of the first row of solar cells and the second row of solar cells extends along a first direction, wherein each of the solar cells has a width measured in a second direction, wherein the second direction is perpendicular to the first direction, wherein a distance between the edge of the first side lap and the second edge, measured in the second direction, is different than the width of the solar cells.

In some embodiments, the distance between the edge of the first side lap and the second edge, measured in the second direction, is less than the width of the solar cells.

In some embodiments, the first side lap defines a first flap portion, and a width of the first flap portion, measured in the second direction, is less than the width of the solar cells.

In some embodiments, the first side lap defines a second flap portion, and a width of the second flap portion, measured in the second direction, is less than the width of the solar cells In some embodiments, the solar shingle further comprises a second side lap at the second end.

In some embodiments, another edge of the first side lap is at the first edge.

In some embodiments, the present invention provides a roofing system, comprising: a roof deck; at least one roofing shingle above the roof deck, wherein the at least one roofing shingle comprises a first roofing shingle, wherein each of the roofing shingles comprises a reveal portion and a head lap portion; at least one step flap above the roof deck, wherein the at least one step flap comprises a first step flap, wherein each of the step flaps comprises a first portion and a second portion; and at least one solar shingle above the roof deck, wherein the at least one solar shingle comprises a first solar shingle, wherein each of the solar shingles comprises: a first end, a second end opposite the first end, a first edge extending from the first end to the second end, and a second edge opposite the first edge and extending from the first end to the second end, a head lap portion extending from a first location between the first end and the second end to a second location between the first end and the second end and extending from the first edge to a third location between the first edge and the second edge, a reveal portion extending from the first location to the second location and from the second edge to the third location, wherein the reveal portion includes a plurality of solar cells, wherein the solar cells of the plurality of solar cells are arranged in at least a first row of solar cells and a second row of solar cells, and a first side lap at the first end, wherein an edge of the first side lap is offset from the second edge and between the first edge and the second edge, wherein the reveal portion of the first roofing shingle is between the edge of the first side lap and the second edge, wherein the first portion of the first step flap is under the first roofing shingle, wherein the second portion of the first step flap is under the first side lap.

In some embodiments, the roofing system omits the at least one roofing shingle.

In some embodiments, the roofing system includes an underlayment between the roof deck and the at least one solar shingle and/or at least one roofing shingle.

In some embodiments, the present invention provides a method, comprising: obtaining at least one roofing shingle, wherein the at least one roofing shingle comprises a first roofing shingle, wherein each of the roofing shingles comprises a reveal portion and a head lap portion; obtaining at least one step flap, wherein the at least one step flap comprises a first step flap, wherein each of the step flaps comprises a first portion and a second portion; and obtaining at least one solar shingle, wherein the at least one solar shingle comprises a first solar shingle, wherein each of the solar shingles comprises: a first end, a second end opposite the first end, a first edge extending from the first end to the second end, and a second edge opposite the first edge and extending from the first end to the second end, a head lap portion extending from a first location between the first end and the second end to a second location between the first end and the second end and extending from the first edge to a third location between the first edge and the second edge, a reveal portion extending from the first location to the second location and from the second edge to the third location, wherein the reveal portion includes a plurality of solar cells, wherein the solar cells of the plurality of solar cells are arranged in at least a first row of solar cells and a second row of solar cells, and a first side lap at the first end, wherein an edge of the first side lap is offset from the second edge and between the first edge and the second edge; installing the first solar shingle on a roof deck; installing the first roofing shingle on the roof deck, wherein the reveal portion of the first roofing shingle is between the edge of the first side lap and the second edge; and installing the first step flap on the roof deck, wherein the first portion of the first step flap is under the first roofing shingle, and the second portion of the first step flap is under the first side lap In some embodiments, the method omits obtaining and installing the at least one roofing shingle.

In some embodiments, the method includes obtaining and installing an underlayment between the roof deck and the at least one solar shingle and/or at least one roofing shingle.

In some embodiments, the present invention provides a bundle of solar shingles, comprising: a plurality of solar shingles, wherein the plurality of solar shingles comprises at least a first solar shingle and a second solar shingle, wherein the first solar shingle is stacked above the second solar roofing shingle, wherein each of the first solar shingle and the second solar shingle comprises: a first end, a second end opposite the first end, a first edge extending from the first end to the second end, and a second edge opposite the first edge and extending from the first end to the second end, a head lap portion extending from a first location between the first end and the second end to a second location between the first end and the second end and extending from the first edge to a third location between the first edge and the second edge, a reveal portion extending from the first location to the second location and from the second edge to the third location, wherein the reveal portion includes a plurality of solar cells, wherein the solar cells of the plurality of solar cells are arranged in at least a first row of solar cells and a second row of solar cells, and a first side lap at the first end, wherein an edge of the first side lap is offset from the second edge and between the first edge and the second edge.

In some embodiments, within the bundle, the solar cells of the plurality of solar cells of the first solar shingle contact the head lap portion of the second solar shingle, and the solar cells of the plurality of solar cells of the second solar shingle contact the head lap portion of the first solar shingle.

In some embodiments, the present invention provides a roofing system, comprising: a roof deck; a first roofing shingle installed on the roof deck, wherein the first roofing shingle comprises a reveal portion and a head lap portion; a first step flap installed on the roof deck; and a first solar shingle installed on the roof deck, wherein the first solar shingle comprises: a reveal portion, wherein the reveal portion includes a plurality of solar cells, a first side lap; a first side flap, and a second side flap, wherein the reveal portion of the first roofing shingle covers the first side flap of the first solar shingle, wherein a first portion of the first step flap covers the second side flap of the first solar shingle, wherein a second portion of the first step flap is under the first side lap of the first solar shingle.

In some embodiments, the plurality of solar cells includes a first row of solar cells and a second row of solar cell, wherein each of the first row of solar cells and the second row of solar cells extends along a first direction, wherein each of the solar cells has a width measured in a second direction, wherein the second direction is perpendicular to the first direction, wherein the first side flap has a width measured in the second direction, wherein the width of the first side flap is different than the width of the solar cells.

In some embodiments, the width of the first side flap is less than the width of the solar cells.

In some embodiments, first solar shingle further comprises: a second side lap, wherein the first and second side laps are on opposite ends of the first solar shingle. In some embodiments, the first portion of the first step flap covers the head lap portion of the first roofing shingle.

In some embodiments, the first portion of the first step flap contacts the head lap portion of the first roofing shingle.

In some embodiments, the system further comprises: a second roofing shingle, wherein the reveal portion of the second roofing shingle covers the head lap portion of the first roofing shingle.

In some embodiments, the first solar shingle further comprises: a head lap portion, and the roofing system further comprises: a second solar shingle, wherein the second solar shingle covers the head lap portion of the first solar shingle.

In some embodiments, the first solar shingle further comprises an electronics module.

In some embodiments, the electronics module comprises a junction box.

In some embodiments, the first solar shingle comprises a second side lap, wherein the electronics module is positioned above the second side lap.

In some embodiments, the present invention provides a roofing system, comprising: a steep slope roof deck; a first roofing shingle installed on the steep slope roof deck, wherein the first roofing shingle comprises a reveal portion and a head lap portion; a first step flap installed on the steep slope roof deck; and a first solar shingle installed on the steep slope roof deck, wherein the first solar shingle comprises: a reveal portion, wherein the reveal portion includes a plurality of solar cells, a first side lap; a first side flap, and a second side flap, wherein the reveal portion of the first roofing shingle is in direct contact with and covers the first side flap of the first solar shingle, wherein a first portion of the first step flap is in direct contact with and covers the head lap portion of the first roofing shingle, and is in direct contact with and covers the second side flap of the first solar shingle, wherein a second portion of the first step flap is under the first side lap of the first solar shingle.

In some embodiments, the plurality of solar cells includes a first row of solar cells and a second row of solar cell, wherein each of the first row of solar cells and the second row of solar cells extends along a first direction, wherein each of the solar cells has a width measured in a second direction, wherein the second direction is perpendicular to the first direction, wherein the first side flap has a width measured in the second direction, wherein the width of the first side flap is different than the width of the solar cells.

In some embodiments, the width of the first side flap is less than the width of the solar cells.

In some embodiments, the first solar shingle further comprises: a second side lap, wherein the first and second side laps are on opposite ends of the first solar shingle.

In some embodiments, the first solar shingle further comprises an electronics module.

In some embodiments, the electronics module comprises a junction box.

In some embodiments, the first solar shingle comprises a second side lap, wherein the electronics module is positioned above the second side lap.

In some embodiments, the system further comprises: a second roofing shingle, wherein the reveal portion of the second roofing shingle covers the head lap portion of the first roofing shingle.

In some embodiments, the first solar shingle further comprises: a head lap portion, and the roofing system further comprises: a second solar shingle, wherein the second solar shingle covers the head lap portion of the first solar shingle.

BRIEF DESCRIPTION OF THE FIGURES

This section refers to the drawings that form a part of this disclosure, and which illustrate some of the embodiments of structure, materials, and/or methods of the present invention described herein.

DETAILED DESCRIPTION

Figure 1:
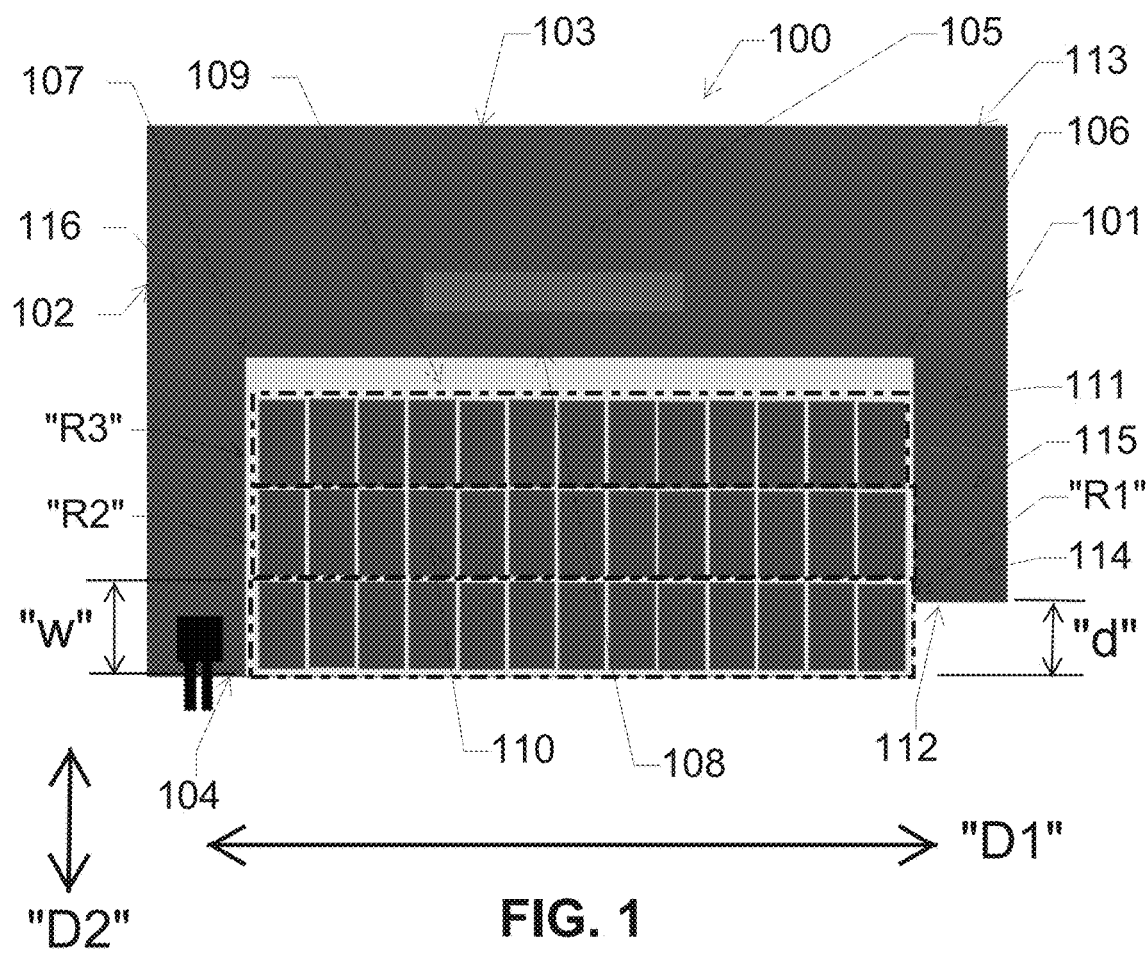
FIG. 1 illustrates a solar shingle, in accordance with some embodiments of the invention.

In addition to the benefits and improvements that the Specification discloses, other objects and advantages of that the Specification provides will become apparent from the following description taken in conjunction with the accompanying figures. Although the description discloses and describes detailed embodiments of the present disclosure, the disclosed embodiments are merely illustrative of the disclosure that may be embodied in various forms. In addition, each of the examples given regarding the various embodiments of the disclosure are intended to be illustrative, and not restrictive.

Throughout the Specification, including the Detailed Description and Claims, the following terms take the meanings explicitly associated herein, unless the context dictates otherwise. The phrases "in an embodiment," "in some embodiments," and any similar phrase, as used herein, do not necessarily refer to the same embodiment or embodiments, though the phrases may refer to the same embodiment or embodiments. Furthermore, the phrases "in another embodiment," and any similar phrase, as used herein, do not necessarily refer to a different embodiment, although the phrases may refer to a different embodiment. All embodiments of the disclosure are intended to be combinable without departing from the scope or spirit of the disclosure.

As used herein, terms such as "comprising," "including," "having," "with," and any similar phrase or phrases, do not limit the scope of a specific claim to the materials or steps recited by the claim.

As used herein, a "steep slope roof" is a roof that is disposed on a building, such as but not limited to a house or other residential structure, having a pitch of Y/X, where Y and X are in a ratio of 4:20 to 20:20, where Y corresponds to the "rise" of the roof, and where X corresponds to the "run" of the roof.

As used herein, an "active" solar cell is a solar cell that converts light (such as, but not limited to, sunlight) into electricity by the photovoltaic effect.

As used herein, installation "above" refers to installation either directly on (that is, with no intervening layer or layers therebetween) or indirectly on (that is, with one or more intervening layers therebetween).

This application describes components of a roofing system, which may be obtained and installed above a roof deck, the components including but not limited to any or all of: one or more solar shingles; one or more roofing shingles (for example, one or more shingles that do not include at least one active solar cell); and/or one or more step flaps, with or without one or more additional components. One or more of these components may be omitted from the roofing system, and/or the roofing system may include one or more other components. The roofing system may be installed above a steep slope roof, above a roof that is sloped but has a slope less than that of a steep slope roof, or above a flat roof (that is, a roof with minimal, or no slope).

In some embodiments, the present invention provides a solar shingle. In some embodiments, the solar shingle may include at least one solar cell. In some embodiments, the at least one solar cell may be an active solar cell. In some embodiments, the at least one solar cell may comprise one solar cell. In some embodiments, the at least one solar cell may comprise a plurality of solar cells. In some embodiments, the at least one solar cell may comprise at least one active solar cell, and at least one solar cell that is not active (that is, inactive). In some embodiments, the at least one solar cell may comprise only active solar cells. In some embodiments, the at least one solar cell may comprise a plurality of solar cells arranged in a single row of solar cells. In some embodiments, the at least one solar cell may comprise a plurality of solar cells arranged in a plurality of rows of solar cells. In some embodiments, the at least one solar cell may comprise a plurality of solar cells arranged in two rows of solar cells. In some embodiments, the at least one solar cell may comprise a plurality of solar cells arranged in three rows of solar cells. In some embodiments, the at least one solar cell may comprise a plurality of solar cells arranged in more than three rows of solar cells. In some embodiments, each row of solar cells may have the same number of solar cells as every other row of solar cells. In some embodiments, each row of solar cells may have a different number of solar cells than every other row of solar cells. In some embodiments, different rows of solar cells may have the same number of solar cells as one or more other rows of solar cells, and a different number of solar cells than one or more other rows of solar cells.

In some embodiments, the solar shingle may include a first end. In some embodiments, the solar shingle may include a second end. In some embodiments, the second end may be opposite the first end.

In some embodiments, the solar shingle may include a first edge. In some embodiments, the solar shingle may include and a second edge. In some embodiments, the second end may be opposite the first edge. In some embodiments, the first edge may extend from the first end to the second end. In some embodiments, the second edge may extend from the first end to the second end.

In some embodiments, the solar shingle may include a head lap portion. In some embodiments, the head lap portion may extend from a first location between the first end and the second end to a second location between the first end and the second end, and extend from the first edge to a third location between the first edge and the second edge. In some embodiments, the head lap portion may be configured to be covered by one or more other solar shingles, one or more roofing shingles, and/or one or more other components, when installed above a roof deck.

In some embodiments, the solar shingle may include a reveal portion. In some embodiments, the reveal portion may extend from the first location to the second location, and from the second edge to the third location. In some embodiments, the reveal portion may include the at least one solar cell, as described herein. In some embodiments, the solar cells may be in at least a first row of solar cells and a second row of solar cells on the reveal portion. In some embodiments, the reveal portion may be configured not to be covered by one or more other solar shingles, one or more roofing shingles, and/or other components when installed above a roof deck.

In some embodiments, the solar shingle may include a first side lap. In some embodiments, the first side lap may be at the first end of the solar shingle. In some embodiments, an edge of the first side lap may be offset from the second edge, and between the first edge and the second edge. In some embodiments, another edge of the first side lap may be at the first edge. In some embodiments, the edge of the first side lap and the other edge of the first side lap may be opposite one another.

In some embodiment, the edge of the first side lap may be formed without removing any portion of the solar shingle. In some embodiments, the edge of the first side lap may be formed by removing a portion of the solar shingle, such as for example a portion of the first side lap. In some embodiments, the edge of the first side lap may be formed by removing a portion of the solar shingle, such as for example by cutting. In some embodiments, the edge of the first side lap may be formed by cutting and removing a portion of the first side lap. In some embodiments, the cutting and removing of the portion of the first side lap may be made by an installer of the solar shingle, such as by a roofer on a job site. In some embodiments, the cutting and removing of the portion of the first side lap may be made by a technician at a manufacturing facility. In some embodiments, the solar shingle may include embossing, printing, and/or one or more other indications as to where one or more cuts are to be made, to cut and remove the portion of the first side lap.

In some embodiments, a distance between the edge of the first side lap and the second edge of the solar shingle may be the same as a corresponding width of a reveal portion of the roofing shingle of the roofing system that includes the solar shingle.

In some embodiments, the one or more rows of solar cells of the solar shingle may extend along a first direction. In some embodiments, one or more of the solar cells may have a width measured in a second direction. In some embodiments, the second direction may be different than the first direction. In some embodiments, the second direction may be perpendicular to the first direction. In some embodiments, a distance between the edge of the first side lap and the second edge of the solar cell, measured in the second direction, may be different than the width of the solar cells. In some embodiments, the width of the solar cells may be greater than the distance. In some embodiments, the width of the solar cells may be less than the distance. In some embodiments, the width of the solar cells may be the same as the distance.

In some embodiments, the solar shingle may include a second side lap. In some embodiments, the second side lap may be at the second end of the solar shingle.

In some embodiments, the first side lap, the second side lap, and/or the head lap of the solar shingle may be covered by any or all of, or none of, one or more other solar shingles, one or more roofing shingles (for example, a shingle that does not include at least one active solar cell), and/or one or more other components of the roofing system installed above the roof deck.

In some embodiments, the roofing system may include an underlayment, such that the components of the roofing system, including any or all of: the one or more solar shingles; the one or more roofing shingles; the one or more step flaps; and/or one or more other components, may be installed above the underlayment. In some embodiments, the roofing system may omit an underlayment, such that the components of the roofing system, including any or all of: the one or more solar shingles; the one or more roofing shingles; the one or more step flaps; and/or other components, may be installed directly on the roof deck, or above or directly on another layer that is not an underlayment.

In some embodiments, the first side lap may define a first flap portion. In some embodiments, a width of the first flap portion, measured in the second direction, may be different than the width of the solar cells. In some embodiments, the width of the first flap portion may be less than the width of the solar cells. In some embodiments, the width of the first flap portion may, but need not, be the same as the distance. In some embodiments, the width of the first flap portion may be greater than the width of solar cells.

In some embodiments, the first side lap may define a second flap portion. In some embodiments, a width of the second flap portion, measured in the second direction, may be different than the width of the solar cells. In some embodiments, the width of the second flap portion may be less than the width of the solar cells. In some embodiments, the width of the second flap portion may, but need not, be the same as the distance, and/or the same as the width of the first flap portion. In some embodiments, the width of the second flap portion may be greater than the width of the solar cells.

In some embodiments, a width of each of any or all of the flap portions may be the same as the corresponding width of the reveal portion of the roofing shingle of the roofing system that includes the solar shingle.

In some embodiments, the solar shingle may include more than two (2) flap portions. In some embodiments, the solar shingle may include only one flap portion.

In some embodiments, any or all, or none, of the flap portions may be formed by making one or more cuts in the first side lap. In some embodiments, any or all of the cuts may be made by an installer of the solar shingle, such as a roofer on a job site. In some embodiments, the one or more cuts may be made by a technician at a manufacturing facility. In some embodiments, the solar shingle may include embossing, printing, and/or one or more other indications as to where the one or more cuts are to be made, to form any or all of the flap portions.

In some embodiments, the second side lap may include an electronics module associated with control and/or operation of the solar shingle, and/or other components installed on the roof deck. In some embodiments, the electronics module may include a junction box. In some embodiments, the second side lap may omit an electronics module. In some embodiments, the second side lap may include an offset edge, as well as one or more flap portions, as discussed with reference to the first side lap. In some embodiments, the first and second side laps may be on opposite sides (for example, left and right ends) of the solar shingle.

In some embodiments, the solar shingle includes a structure, composition, component or components, and/or function and/or functions similar to those of one or more embodiments of the photovoltaic shingles disclosed in PCT International Patent Publication No. WO 2022/051593, Application No. PCT/US2021/049017, published Mar. 10, 2022, entitled Building Integrated Photovoltaic System, owned by GAF Energy LLC, the contents of which are incorporated by reference herein in its entirety.

In some embodiments, the roofing system may include one or more step flaps. In some embodiments, one or more of the steps flaps may be the same as one another. In some embodiments, one or more of the steps flaps may be different than other step flaps. In some embodiments, all of the step flaps may be the same as one another. In some embodiments, all of the step flaps may be different than each other.

In some embodiments, the step flaps include a structure, composition, component and/or components, and/or function and/or function similar to those of one or more embodiments of the step flaps disclosed in U.S. Patent Application Publication No. US 2022/0173694 A1, published Jun. 2, 2022, entitled Step Flaps for Photovoltaic and Roofing Shingles, owned by GAF Energy LLC, the contents of which are incorporated by reference herein in its entirety.

In some embodiments, one or more of the step flaps may be made from a metal material, such as but not limited to steel, aluminum, copper, lead, and/or combinations of these materials.

In some embodiments, one or more of the step flaps may be made from a polymer. In some embodiments, one or more of the step flaps may be made from thermoplastic polyolefin (TPO). In some embodiments, one or more of the step flaps may be made from polyethylene terephthalate (PET), polyethylene naphthalate (PEN), polyetheretherketone (PEEK), polyaryletherketone (PAEK), polyarylate (PAR), polyetherimide (PEI), polyarylsulfone (PAS), polyethersulfone (PES), polyamideimide (PAI), or polyimide; polyvinyl chloride (PVC); ethylene propylene diene monomer (EPDM) rubber; silicone rubber; fluoropolymers-ethylene tetrafluoroethylene (ETFE), polyvinylidene fluoride (PVDF), tetrafluoroethylene-hexafluoropropylene copolymers (FEP), and tetrafluoroethylene-hexafluoropropylene-vinylidene fluoride copolymers (THV), or blends thereof.

In some embodiments, the material or materials of one or more of the steps flaps may be the same as the material or materials of one or more of other steps flaps. In some embodiments, the material or materials of one or more of the steps flaps may be different than the material or materials of one or more of the step flaps. In some embodiments, all of the step flaps may be the same material or materials as one another. In some embodiments, all of the step flaps may be a different material or materials than each other.

In some embodiments, the roofing system may include one or more roofing shingles (for example, shingles that do not include at least one active solar cell). In some embodiments, the roofing shingles may include a head lap portion and a reveal portion. In some embodiments, the head lap portion may be covered by one or more components of the roofing system. In some embodiments, the reveal portion may not be covered by one or more components of the roofing system. In some embodiments, the reveal portion may be exposed to the environment.

In some embodiments, one or more of the described components of the roofing system may be omitted, and/or the roofing system may include one or more other components.

With reference to the figures, FIG. 1 illustrates a first solar shingle 100, in accordance with some embodiments of the present invention. In some embodiments, one or more details of the first solar shingle 100 may be in accordance with the solar shingle described herein. Thus, as shown and discussed, in some embodiments, the first solar shingle 100 may include a first end 101 and a second end 102, and the second end 102 may be opposite the first end 101.

In some embodiments, the first solar shingle 100 may include a first edge 103 and a second edge 104, and the second edge 104 may be opposite the first edge 103. In some embodiments, the first edge 103 may extend from the first end 101 to the second end 102, and the second edge 104 may extend from the first end 101 to the second end 102.

As shown, in some embodiments, the first solar shingle 100 may include a head lap portion 105. In some embodiments, the head lap portion 105 may extend from a first location 106 between the first end 101 and the second end 102 to a second location 107 between the first end 101 and the second end 102, and may extend from the first edge 103 to a third location 108 between the first edge 103 and the second edge 104.

As shown, in some embodiments, the first solar shingle 100 may include a reveal portion 109 extending from the first location 106 to the second location 107, and from the second edge 104 to the third location 108. As discussed, the reveal portion 109 may include at least one of the solar cell 110. In some embodiments, the first solar shingle 100 may include a plurality of the solar cells 110. In some embodiments, the solar cells 110 may be arranged in at least a first row "R" of the solar cells 110. In some embodiments, the solar cells 110 may be arranged in the first row "R1" and a second row "R2" of the solar cells 110. In some embodiments, the solar cells 110 may be arranged in at least three rows—"R1," "R2," and "R3"—of the solar cells 110. In some embodiments, the first row "R1" may be proximate the second edge 104 of the first solar shingle 100. In some embodiments, the second row "R2" and the third row "R3" may be above the first row "R1" on the reveal portion 109.

Although not shown in the figures, as discussed, in some embodiments, the solar cells 110 may be arranged in more than three rows of the solar cells 110, or may be arranged in less than three rows of the solar cells 110.

In some embodiments, the first solar shingle 100 may include a first side lap 111 at the first end 101. As discussed, an edge 112 of the first side lap 111 may be offset from the second edge 104, and may be between the first edge 103 and the second edge 104.

In some embodiments, the one or more rows of the solar cells 110 may extend along a first direction "D1." In some embodiments, one or more of the solar cells 110 may have a width "w" measured in a second direction "D2," and the second direction "D2" may be perpendicular to the first direction "D1." In some embodiments, a distance "d" between the edge 112 of the first side lap 111 and the second edge 104, measured in the second direction "D2," may be different than the width "w" of the solar cells 110. In some embodiments, as shown in the figure, the width "w" of the solar cells 110 may be greater than the distance "d." In some embodiments, although not shown, the width "w" of the solar cells 110 may be less than the distance "d," or, in some embodiments, the width "w" of the solar cells 110 may be the same as the distance "d." It is understood that when the width "w" is different than the distance "d," the first solar shingle 100 may be installed on a roof deck in a roofing system proximate one or more roofing shingles having reveal portions of a different size than the width "w" of the solar cells 110, as discussed.

In some embodiments, the first side lap 111 may define a first flap portion 114. As described, a width of the first flap portion 114, measured in the second direction "D2," may be different than the width "w" of the solar cells 110. In some embodiments, as shown, the width of the first flap portion 114 may be less than the width "w" of the solar cells 110. In some embodiments, the width of the first flap portion 114 may, but need not, be the same as the distance "d." In some embodiments, although not shown, the width of the first flap portion 114 may be greater than the width "w" of the solar cells 110. It is understood that when the width of the first flap portion 114 is different than the distance "d," the first solar shingle 100 may be installed in a roofing system proximate one or more roofing shingles having reveal portions of a different size than the width "w" of the solar cells 110, as discussed.

In some embodiments, the first side lap 111 may define a second flap portion 115. A width of the second flap portion 115, measured in the second direction "D2," may be different than the width "w" of the solar cells 110. In some embodiments, as shown, the width of the second flap portion 115 may be less than the width "w" of the solar cells 110. In some embodiments, the width of the second flap portion 115 may, but need not, be the same as the distance "d," and/or the same as the width of the first flap portion 114. In some embodiments, although not shown, the width of the second flap portion 115 may be greater than the width "w" of the solar cells 110. It is understood that when the width of the second flap portion 115 is different than the distance "d," the first solar shingle 100 may be installed in a roofing system with one or more roofing shingles having reveal portions of a different size than the width "w" of the solar cells 110, as discussed.

As discussed, although not shown in the drawings, in some embodiments, the first solar shingle 100 may include more than 2 flap portions, or one flap portion.

In some embodiments, the first solar shingle 100 may include a second side lap 116 at the second end 102. In some embodiments, the first solar shingle 100 may omit the second side lap 116. In some embodiments, the second side lap 116 may include an electronics module associated with control and/or operation of the first solar shingle 100, and/or other components installed on the roof deck. In some embodiments, the electronics module may include a junction box. In some embodiments, the second side lap 116 may omit an electronics module. In some embodiments, the second side lap 116 may include an offset edge, as well as one or more flap portions, as discussed with reference to the first side lap 111.

FIGS. 2-8 illustrate installation of components of a roofing system 1000 on a roof deck 200, in accordance with some embodiments of the invention, as well as methods of installing the roofing system 1000. It is understood, however, that the installation need not be performed in the order suggested by the figures.

Figure 2:
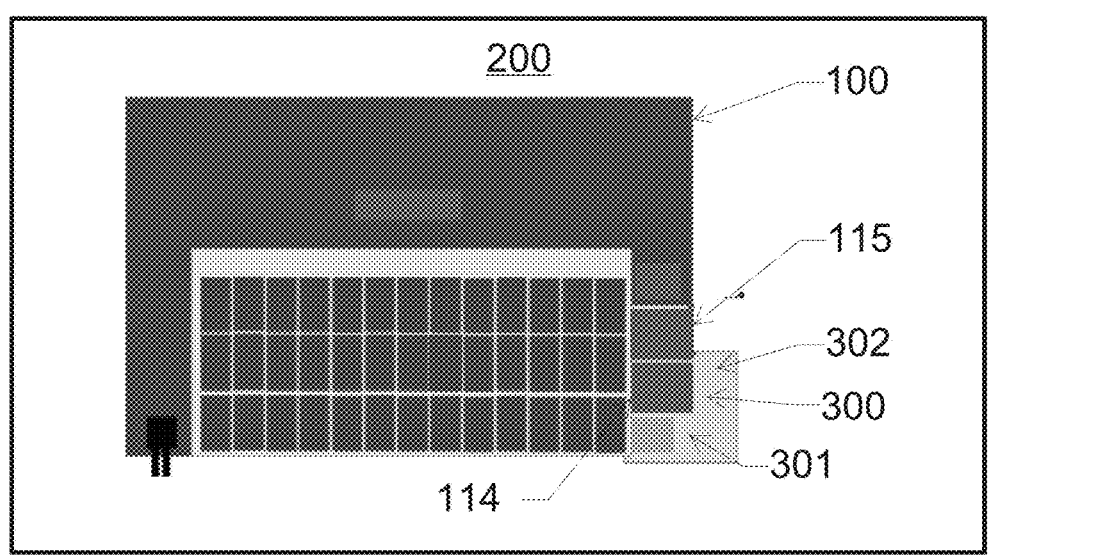
FIG. 2 illustrates installation of components of a roofing system on a roof deck, including a solar shingle, in accordance with some embodiments of the invention.

As shown in the figures, including FIG. 2, in some embodiments, the first solar shingle 100 may be obtained, and installed above the roof deck 200. The roof deck 200 may be either larger or smaller, on any or all sides of the first solar shingle 100, than the size of the roof deck 200 shown in the figures. In some embodiments, the first solar shingle 100 may be mechanically attached, such as by using one or more fasteners, through the head lap portion 105, the first side lap 111, and/or the second side lap 116, into the roof deck 200. In some embodiments, the head lap portion 105, the first side lap 111, and/or the second side lap 116 may be adhered to the roof deck 200 or one or more layers between the first solar shingle 100 and the roof deck 200. In some embodiments, the fasteners may be one or more screws, nails, rivets, and/or staples.

In some embodiments, a first step flap 300 may be obtained, and installed above the roof deck. The first step flap 300 may comprise a first portion 301 and a second portion 302. During installation, at least a part of the first portion 301 of the first step flap 300 may not be covered by any portion of the first solar shingle 100. At least a part of the second portion 302 of the first step flap 300 may be under (that is, covered by) the first side lap 111. In some embodiments, at least a part of the second portion 302 of the first step flap 300 may be under the first flap portion 114. In some embodiments, at least a part of the second portion 302 of the first step flap 300 may be under the second flap portion 115. In some embodiments, the first step flap 300 may be attached to the roof deck 200 with one or more fasteners, or may be adhered to the roof deck 200 or to one or more layers between the first step flap 300 and the roof deck 200, as described.

Although not shown in FIG. 2, in some embodiments, one or more roofing shingles (for example, a shingle without at least one active solar cell) may be obtained, and installed above the roof deck 200. At least part of a reveal portion of the roofing shingle may be exposed—that is, not covered by any portion of the first solar shingle 100 and/or the first step flap 300. At least a part of the reveal portion may cover at least a part of the first portion 301 of the first step flap 300, and may be within the area between the second edge 104 and the edge 112. In some embodiments, at least a part of the reveal portion of the roofing shingle may be exposed to the environment. In some embodiments, the roofing shingle may be attached to the roof deck 200 with one or more fasteners, or may be adhered to the roof deck 200 or to one or more layers between the roofing shingle and the roof deck 200, as described.

In some embodiments, at least a part of a head lap portion of the unshown roofing shingle may be under the first side lap 111. In some embodiments, at least a part of a head lap portion of the roofing shingle may be under the first flap portion 114. In some embodiments, at least a part of a head lap portion of the roofing shingle may cover the first flap portion 114. In some embodiments, at least a part of a head lap portion of the roofing shingle may be under the second flap portion 115. In some embodiments, at least a part of the roofing shingle may cover (that is, may be over) at least a part of the first step flap 300.

Figure 3:
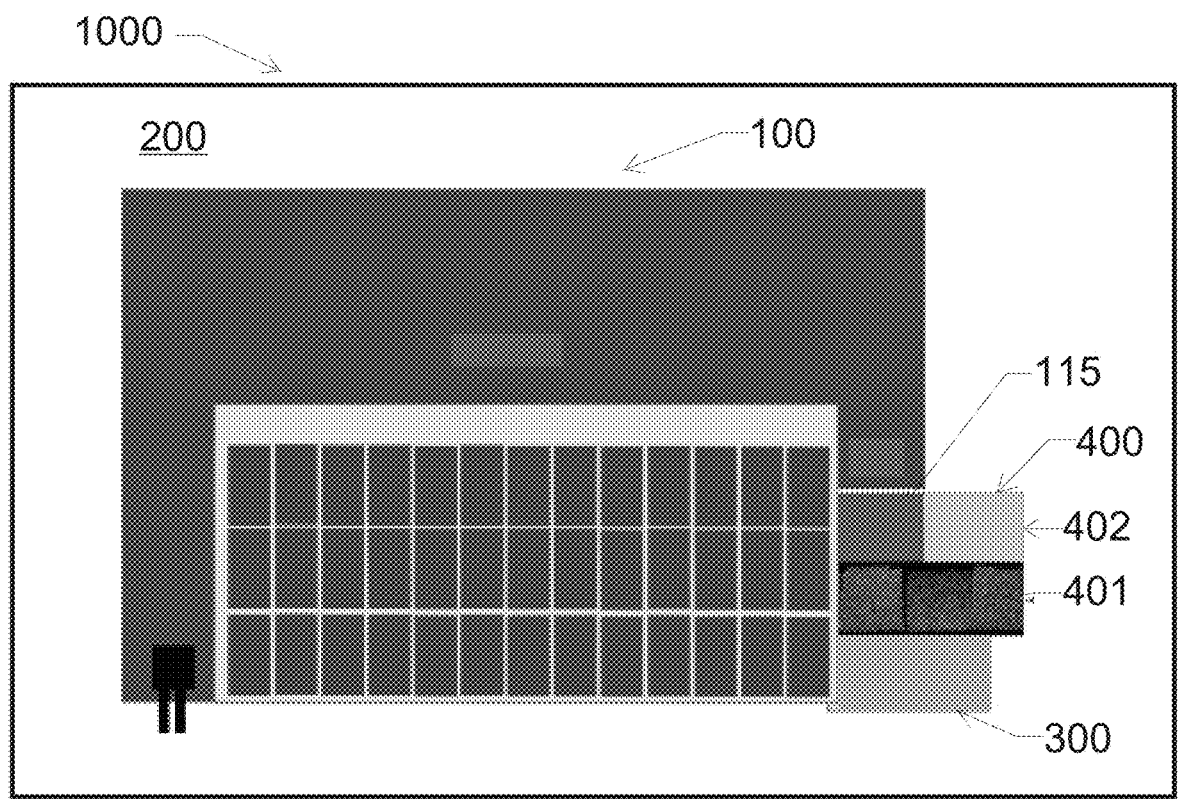
FIG. 3 illustrates installation of components of a roofing system on a roof deck, including a solar shingle, in accordance with some embodiments of the invention.

As shown in the figures, including FIG. 3, a first roofing shingle 400 may be obtained, and installed above the roof deck 200. In some embodiments, at least a part of a reveal portion 401 of the first roofing shingle 400 may be exposed—that is, not covered by any portion of the first solar shingle 100 and/or the first step flap 300. In some embodiments, the reveal portion 401 of the first roofing shingle 400 may be exposed to the environment. In some embodiments, the first roofing shingle 400 may be attached to the roof deck 200 with one or more fasteners, or may be adhered to the roof deck 200 or to one or more layers between the first roofing shingle 400 and the roof deck 200, as described.

As shown, in some embodiments, at least a part of the reveal portion 401 of the first roofing shingle 400 may cover the first flap portion 114. In some embodiments, at least a part of the head lap portion 402 of the first roofing shingle 400 may be under the second flap portion 115. In some embodiments, at least a part of the first roofing shingle 400 may cover at least a part of the first step flap 300. In some embodiments, the first roofing shingle 400 may cover the head lap portion of the unshown roofing shingle described above. In some embodiments, although not shown in the drawings, ends of the unshown roofing shingle and the first roofing shingle 400 may be offset from one another along the first direction "D1," such that the ends are not aligned with one another.

Figure 4:
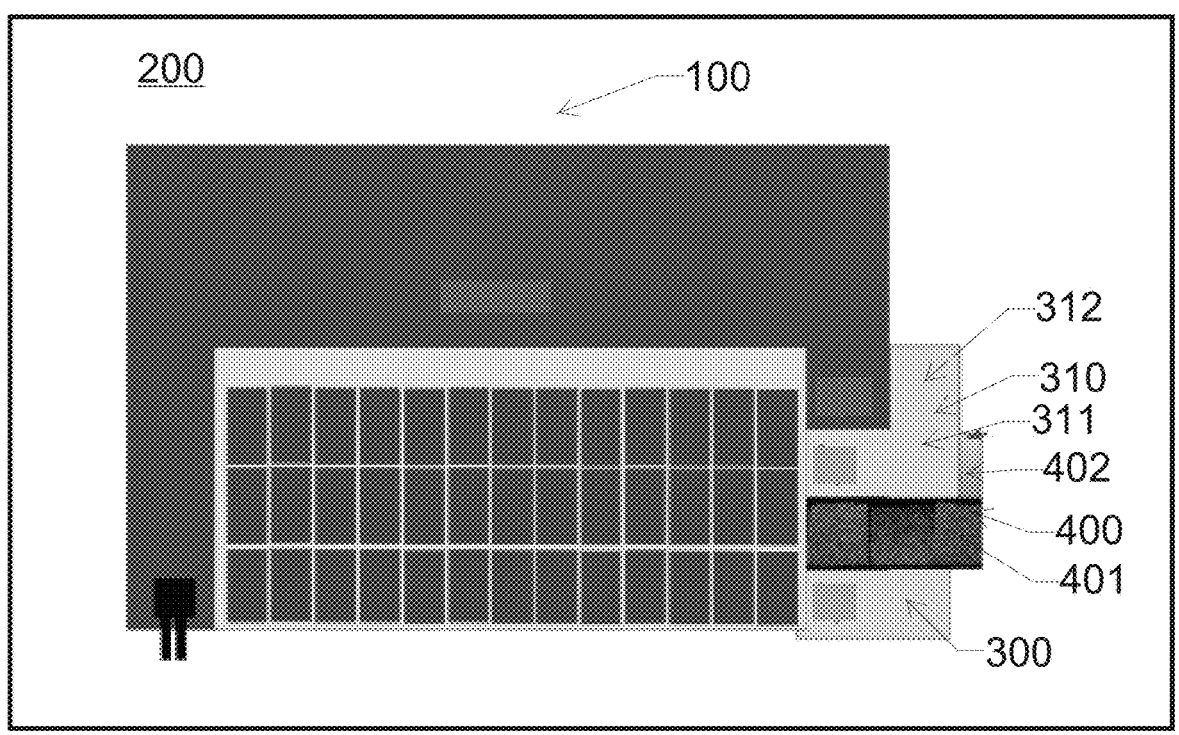
FIG. 4 illustrates installation of components of a roofing system on a roof deck, including a solar shingle, in accordance with some embodiments of the invention.

As shown in the figures, including FIG. 4, in some embodiment, a second step flap 310 may be obtained, and installed above the roof deck 200. Details of the second step flap 310 may be the same as, or different than, the first step flap 300. In some embodiments, the second step flap 310 may include a first portion 311 and a second portion 312. In some embodiments, at least a part of the first portion 311 of the second step flap 310 may not be covered by any portion of the first solar shingle 100. In some embodiments, at least a part of the first portion 311 may cover the second flap portion 115. In some embodiments, at least a part of the first portion 311 may cover the head lap portion 402 of the first roofing shingle 400. In some embodiments, at least a part of the second portion 312 may be under the first side lap 111. In some embodiments, the second step flap 310 may be attached to the roof deck 200 with one or more fasteners, or may be adhered to the roof deck 200 or to one or more layers between the second step flap 310 and the roof deck 200, as described.

Figure 5:
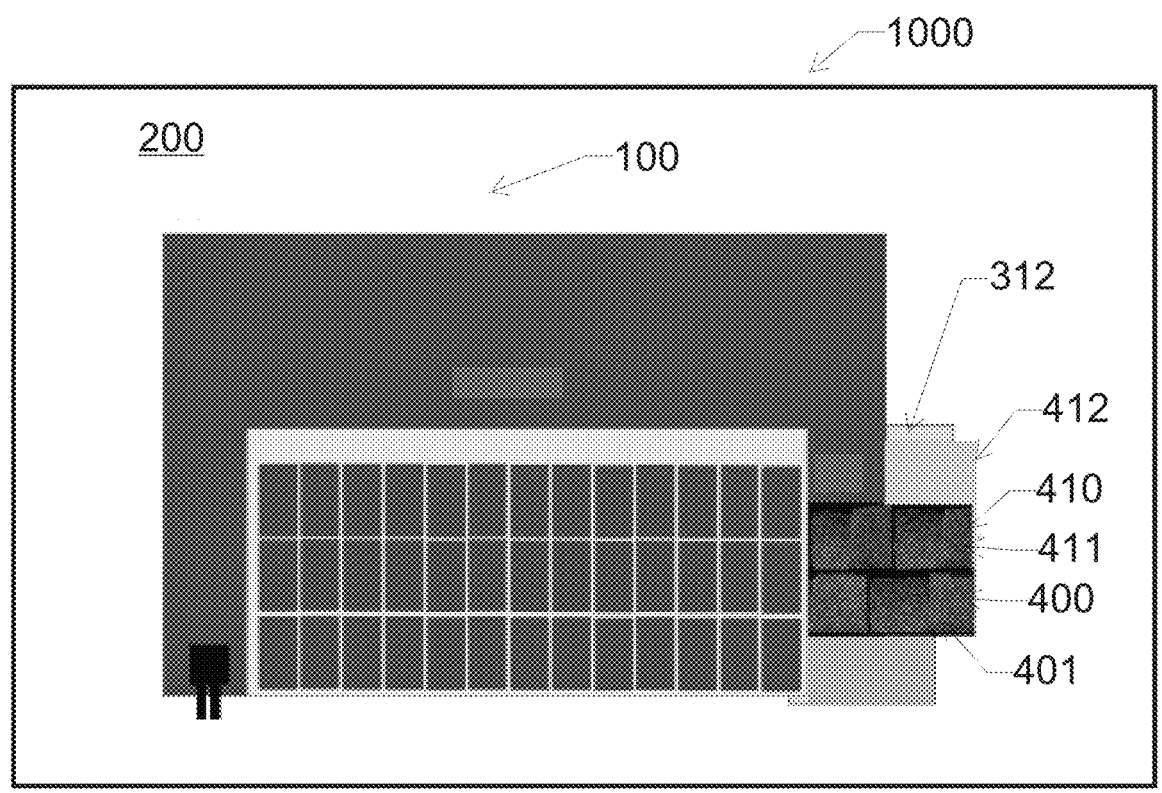
FIG. 5 illustrates installation of components of a roofing system on a roof deck, including a solar shingle, in accordance with some embodiments of the invention.

As shown in the figures, including FIG. 5, a second roofing shingle 410 may be obtained, and installed above the roof deck 200. In some embodiments, at least a part of a reveal portion 411 of the second roofing shingle 410 may be exposed—that is, not covered by any portion of the first solar shingle 100, the first step flap 300, and/or the second step flap 310. In some embodiments, at least a part of the reveal portion 411 of the first roofing shingle 400 may be exposed to the environment. In some embodiments, at least a part of a head lap portion 412 of the second roofing shingle 410 may be under the first side lap 111. In some embodiments, at least a part of the second roofing shingle 410 may cover at least a part of the second step flap 310. In some embodiments, although not shown in the drawings, ends of the unshown roofing shingle, the first roofing shingle 400, the second roofing shingle 410, and/or any other roofing shingle or roofing shingles may be offset from one another along the first direction "D1," such that the ends are not aligned with one another. In some embodiments, the second roofing shingle 410 may be attached to the roof deck 200 with one or more fasteners, or may be adhered to the roof deck 200 or to one or more layers between the second roofing shingle 410 and the roof deck 200, as described.

In some embodiments, a width of the reveal portion of the unshown roofing shingle, a width of the reveal portion 401 of the first roofing shingle 400, a width of the reveal portion 411 of the second roofing shingle 410, the width of the first flap portion 114 of the first solar shingle 100, and the width of the second flap portion 115 of the first solar shingle 100, measured in the direction "D2," are the same as the distance "d." By this arrangement, the roofing system 1000 integrates the first solar shingle 100 with the solar cells 110 having a width measured in the direction "D2," with one or more roofing shingles having reveal portions with a width measured in the direction "D2," where the two widths are not the same.

In some embodiment, a width of the first step flap 300 and/or the second step flap 310, measured in the direction "D2," are greater than 2 times the distance "d."

Figure 6:
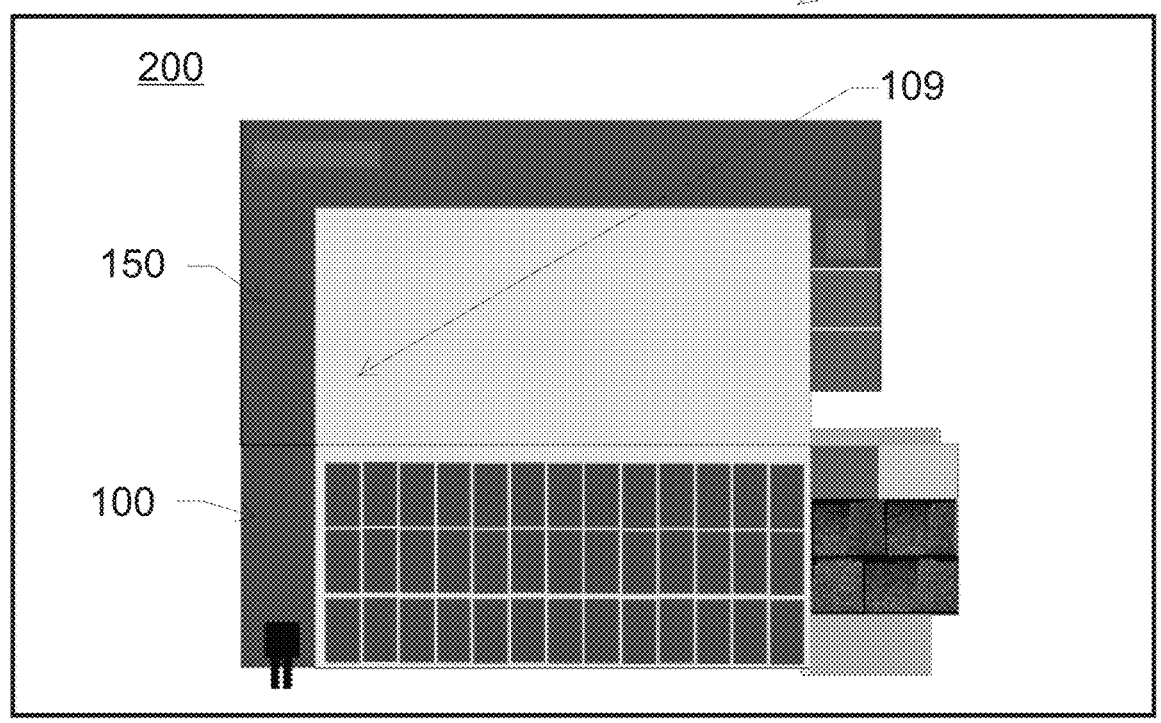
FIG. 6 illustrates installation of components of a roofing system on a roof deck, including a solar shingle, in accordance with some embodiments of the invention.
Figure 7:
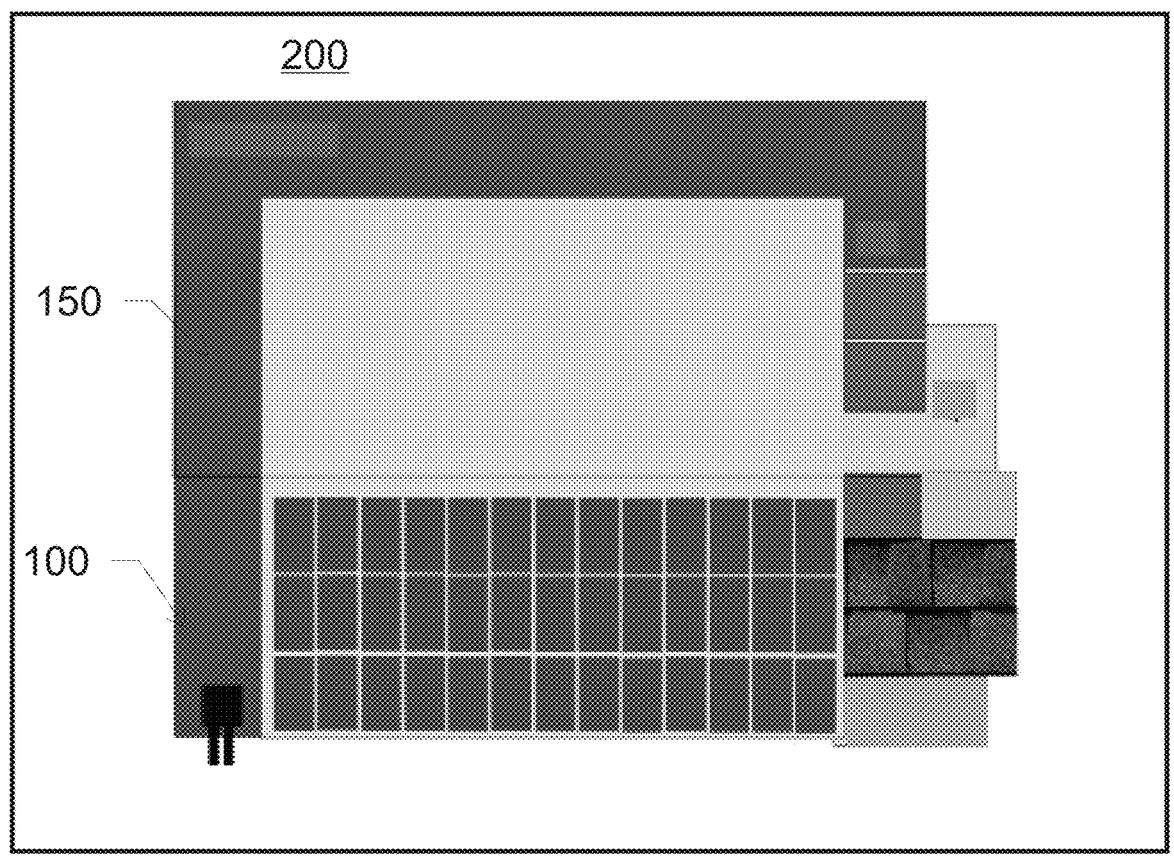
FIG. 7 illustrates installation of components of a roofing system on a roof deck, including a solar shingle, in accordance with some embodiments of the invention.

As shown in the figures, including FIG. 6 and FIG. 7, a second solar shingle 150 may be obtained, and installed proximate the first solar shingle 100 above the roof deck 200. In some embodiments, details of the second solar shingle 150 may be in accordance with the solar shingle and/or the first solar shingle 100 shown and described. Although the figure shows that the second solar shingle 150 does not include any of the solar cells 110, in some embodiments the second solar shingle 150 may include one or more of the solar cells 110, as shown and described. In some embodiments, the second solar shingle 150 may be installed as the first solar shingle 100.

As shown, the reveal portion 109 of the second solar shingle 150 may cover the head lap portion 105 of the first solar shingle 100. In some embodiments, although not shown in the figures, one or more roofing shingles, such as one or more of the first roofing shingle 400, one or more of the second roofing shingle 410, and/or one or more other roofing shingles, may be obtained and installed in place of the second solar shingle 150. In some embodiments, the above-described obtaining and installation of first step flap 300, second step flap 310, the unshown roofing shingle, the first roofing shingle 400, and/or the second roofing shingle 410, may be repeated proximate the second solar shingle 150. In some embodiments, one or more roofing shingles, and/or one or more other components, may be obtained and installed above the roof deck 200 proximate the second edge 104 and/or the second end 102 of the first solar shingle 100.

Figure 8:
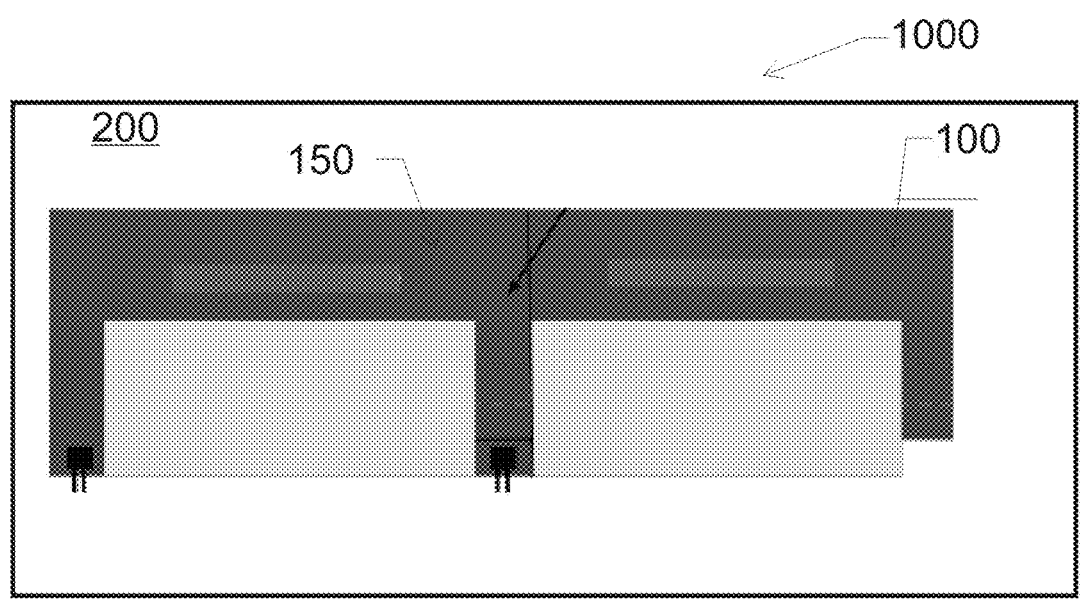
FIG. 8 illustrates installation of components of a roofing system on a roof deck, including a solar shingle, in accordance with some embodiments of the invention.

As shown in the figures, including FIG. 8, the second solar shingle 150 may be obtained, and installed adjacent an end of the first solar shingle 100 above the roof deck 200. Although the figure shows that each of the first solar shingle 100 and the second solar shingle 150 does not include the solar cells 110, either or both of the first solar shingle 100 and/or the second solar shingle 150 may or may not include one or more of the solar cells 110, as shown and described. In some embodiments, the second side lap 116 of the first solar shingle 100 may either cover or be under the first side lap 111 of the second solar shingle 150.

In some embodiments, the first end 101 of the second solar shingle 150 may be proximate—for example, butted-up against—the second end 102 of the first solar shingle 100. In some embodiments, one or more components of the roofing system 1000, such as one or more of the first roofing shingle 400, one or more of the second roofing shingle 410, one or more of the first step flap 300, one or more of the second step flap 310, and/or one or more other components, may be obtained and installed above the roof deck as shown and described.

Figure 9:
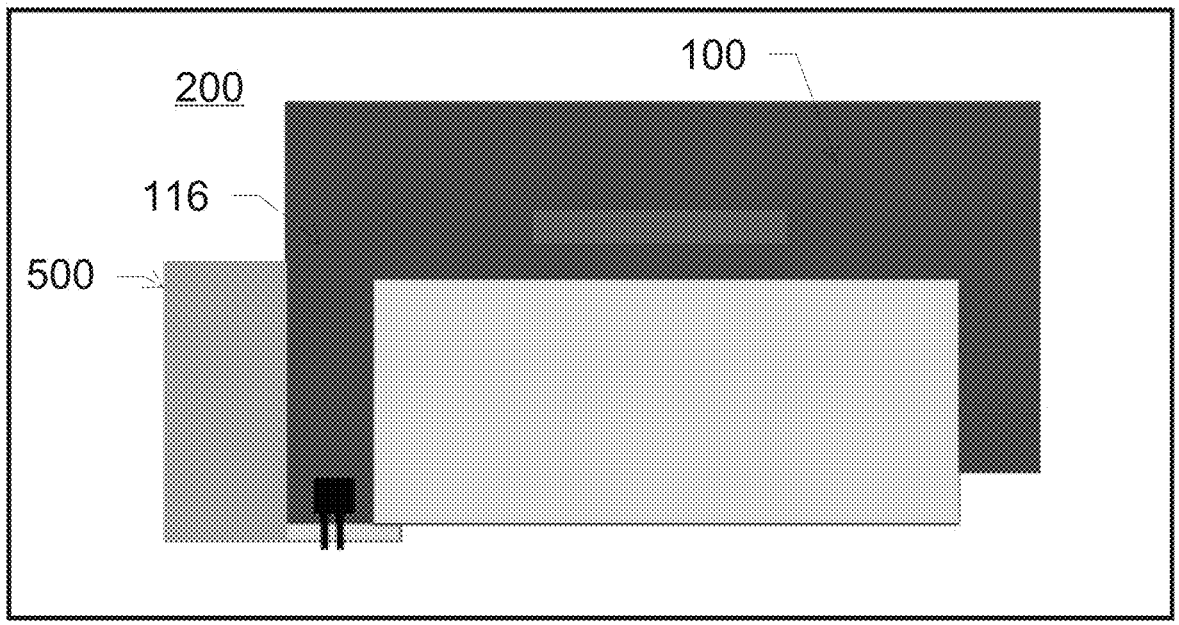
FIG. 9 illustrates installation of components of a roofing system on a roof deck, including a solar shingle, in accordance with some embodiments of the invention.
Figure 10:
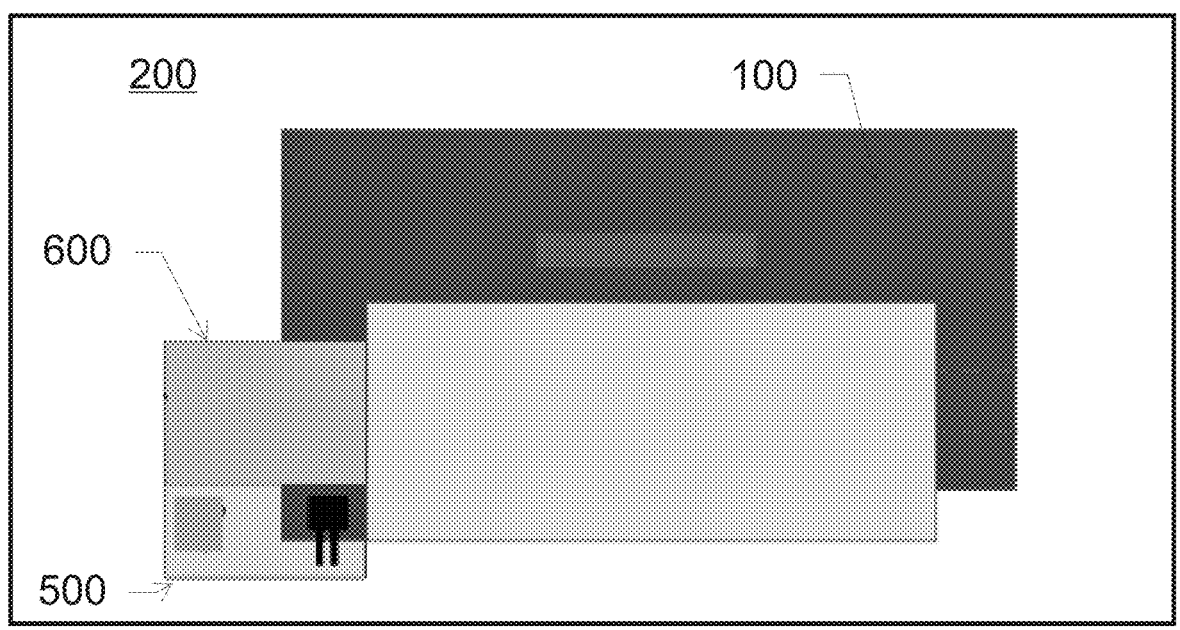
FIG. 10 illustrates installation of components of a roofing system on a roof deck, including a solar shingle, in accordance with some embodiments of the invention.

FIGS. 9 and 10 illustrate installation of components of the roofing system 1000 above the roof deck 200, in accordance with some embodiments of the present invention. It is understood, however, that the installation need not be performed in the order suggested by the figures. Further, it is understood that the components may be installed with one or more of any or all of the discussed components of the roofing system 1000.

As shown in the figures, including FIG. 9 and FIG. 10, in some embodiments, the roofing system 1000 may include a third step flap 500. In some embodiments, at least a part of the third step flap 500 may be under the first solar shingle 100. In some embodiments, at least a part of the third step flap 500 may be under the second side lap 116 of the first solar shingle 100. In some embodiments, the third step flap 500 may be the same as the first step flap 300 and/or the second step flap 310. In some embodiments, the third step flap 500 may be larger in at least one dimension than the first step flap 300 and/or the second step flap 310. In some embodiments, the third step flap 500 may be larger in at least two dimensions than the first step flap 300 and/or the second step flap 310. In some embodiments, the third step flap 500 may be larger in three dimensions than the first step flap 300 and/or the second step flap 310. In some embodiments, the third step flap 500 may be installed as the first step flap 300 and/or the second step flap 310.

As shown in the figures, in some embodiments, the roofing system 1000 may include a fourth step flap 600. At least a part of the fourth step flap 600 may cover at least a part of the first solar shingle 100. In some embodiments, at least a part of the fourth step flap 600 may cover at least a part of the second side lap 116. In some embodiments, the fourth step flap 600 may be the same as the first step flap 300, the second step flap 310, and/or the third step flap 500. In some embodiments, the fourth step flap 600 may be larger in at least one dimension than the first step flap 300, the second step flap 310, and/or the third step flap 500. In some embodiments, the fourth step flap 600 may be installed as the first step flap 300, the second step flap 310, and/or the third step flap 500.

In some embodiments, the fourth step flap 600 may be adhered to the first solar shingle 100, such that no penetration extends through the fourth step flap 600 and/or the first solar shingle 100. In some embodiments, the fourth step flap 600 may be connected to the first solar shingle 100 by one or more penetrating fastener, such as but not limited to one or more nails, one or more nails staples, one or more nails screws, one or more nails rivets, and/or combinations of one or more of these fasteners.

Variations, modifications, and alterations to embodiments of the present disclosure described above will make themselves apparent to those skilled in the art. All such variations, modifications, alterations and the like are intended to fall within the spirit and scope of the present disclosure, limited solely by the appended claims.

While several embodiments of the present disclosure have been described, it is understood that these embodiments are illustrative only, and not restrictive, and that many modifications may become apparent to those of ordinary skill in the art. For example, all dimensions discussed herein are provided as examples only, and are intended to be illustrative and not restrictive.

Any feature or element that is positively identified in this description may also be specifically excluded as a feature or element of an embodiment of the present as defined in the claims.

The disclosure described herein may be practiced in the absence of any element or elements, limitation or limitations, which is not specifically disclosed herein. The terms and expressions which have been employed are used as terms of description and not of limitation, and there is no intention in the use of such terms and expressions of excluding any equivalents of the features shown and described or portions thereof, but it is recognized that various modifications are possible within the scope of the disclosure.

The invention claimed is:

1. A roofing system, comprising:
   a roof deck;
   a first roofing shingle installed on the roof deck,
      wherein the first roofing shingle comprises a reveal portion and a head lap portion;
   a first step flap installed on the roof deck; and
   a first solar shingle installed on the roof deck,
      wherein the first solar shingle comprises:
         a reveal portion,
            wherein the reveal portion includes a plurality of solar cells,
         a first side lap defining a first side flap, and a second side flap
         wherein the reveal portion of the first roofing shingle covers the first side flap of the first solar shingle,
         wherein a first portion of the first step flap covers the second side flap of the first solar shingle,
         wherein a second portion of the first step flap is under the first side lap of the first solar shingle.

2. The roofing system of claim 1,
   wherein the plurality of solar cells includes a first row of solar cells and a second row of solar cell,
      wherein each of the first row of solar cells and the second row of solar cells extends along a first direction,
   wherein each of the solar cells has a width measured in a second direction,
      wherein the second direction is perpendicular to the first direction,
   wherein the first side flap has a width measured in the second direction,
      wherein the width of the first side flap is different than the width of the solar cells.

3. The roofing system of claim 2, wherein the width of the first side flap is less than the width of the solar cells.

4. The roofing system of claim 1, wherein the first solar shingle further comprises:
   a second side lap,
      wherein the first and second side laps are on opposite ends of the first solar shingle.

5. The roofing system of claim 4, wherein the first portion of the first step flap contacts the head lap portion of the first roofing shingle.

6. The roofing system of claim 1, wherein the first portion of the first step flap covers the head lap portion of the first roofing shingle.

7. The roofing system of claim 1, further comprising:
   a second roofing shingle,
      wherein the reveal portion of the second roofing shingle covers the head lap portion of the first roofing shingle.

8. The roofing system of claim 1, wherein the first solar shingle further comprises:
   a head lap portion,
   wherein the roofing system further comprises:
      a second solar shingle,
         wherein the second solar shingle covers the head lap portion of the first solar shingle.

9. The roofing system of claim 1, wherein the first solar shingle further comprises an electronics module.

10. The roofing system of claim 9, wherein the electronics module comprises a junction box.

11. The roofing system of claim 9, wherein the first solar shingle comprises a second side lap,
  wherein the electronics module is positioned above the second side lap.

12. A roofing system, comprising:
  a steep slope roof deck;
  a first roofing shingle installed on the steep slope roof deck,
    wherein the first roofing shingle comprises a reveal portion and a head lap portion;
  a first step flap installed on the steep slope roof deck; and
  a first solar shingle installed on the steep slope roof deck,
    wherein the first solar shingle comprises:
      a reveal portion,
        wherein the reveal portion includes a plurality of solar cells,
      a first side lap defining a first side flap, and a second side flap
    wherein the reveal portion of the first roofing shingle is in direct contact with and covers the first side flap of the first solar shingle,
    wherein a first portion of the first step flap
      is in direct contact with and covers the head lap portion of the first roofing shingle, and
      is in direct contact with and covers the second side flap of the first solar shingle,
    wherein a second portion of the first step flap is under the first side lap of the first solar shingle.

13. The roofing system of claim 12,
  wherein the plurality of solar cells includes a first row of solar cells and a second row of solar cell,
    wherein each of the first row of solar cells and the second row of solar cells extends along a first direction,
  wherein each of the solar cells has a width measured in a second direction,
    wherein the second direction is perpendicular to the first direction,
  wherein the first side flap has a width measured in the second direction,
    wherein the width of the first side flap is different than the width of the solar cells.

14. The roofing system of claim 13, wherein the width of the first side flap is less than the width of the solar cells.

15. The roofing system of claim 12, wherein the first solar shingle further comprises:
  a second side lap,
    wherein the first and second side laps are on opposite ends of the first solar shingle.

16. The roofing system of claim 12, wherein the first solar shingle further comprises an electronics module.

17. The roofing system of claim 16, wherein the electronics module comprises a junction box.

18. The roofing system of claim 16, wherein the first solar shingle comprises a second side lap,
  wherein the electronics module is positioned above the second side lap.

19. The roofing system of claim 12, further comprising:
  a second roofing shingle,
    wherein the reveal portion of the second roofing shingle covers the head lap portion of the first roofing shingle.

20. The roofing system of claim 12, wherein the first solar shingle further comprises:
  a head lap portion,
  wherein the roofing system further comprises:
    a second solar shingle,
  wherein the second solar shingle covers the head lap portion of the first solar shingle.

* * * * *